United States Patent [19]
Swaine

[11] 3,834,244
[45] Sept. 10, 1974

[54] POWER TRANSMISSION SYSTEM
[76] Inventor: Harry Dugdale Swaine, 15 Northborough Road, London, England
[22] Filed: Aug. 14, 1973
[21] Appl. No.: 388,175

[30] Foreign Application Priority Data
Aug. 17, 1972 Great Britain.................... 38383/72

[52] U.S. Cl. ............................................... 74/219
[51] Int. Cl. ............................................ F16h 7/00
[58] Field of Search........................... 74/219, 217 R

[56] References Cited
UNITED STATES PATENTS
1,828,803  10/1931  Freeman et al...................... 74/219
2,092,736   9/1937  Kelly................................. 74/219 X
3,636,784   1/1972  Sandstrom ........................ 74/217 R Primary Examiner—Leonard H. Gerin
Attorney, Agent, or Firm—Karl W. Flocks

[57] ABSTRACT

The present invention relates to a power transmission system comprising a housing, a transmission shaft mounted for rotation in that housing and extending outside the housing on either side thereof, a crown wheel gear mounted on the transmission shaft within the housing, a pinion gear in engagement with the crown wheel mounted on an output shaft carried for rotation in the housing, and a plurality of one-way clutches mounted in pairs on said transmission shaft, one of each pair being disposed on each side of the housing, each said clutch comprising a drive member by which a drive may be effected in one direction of rotation from a power source to said transmission shaft through the clutch.

8 Claims, 2 Drawing Figures

POWER TRANSMISSION SYSTEM

BACKGROUND OF THE INVENTION

This invention relates to a mechanical power transmission system.

An object of the invention is to provide a flexible power transmission system enabling mechanical power from a first power unit, for instance a petrol engine or manpower, or from one or more further sources of power, to be connected to, and disconnected from, an item or items to be driven.

A particular exemplary application of the invention is in the drive of a road vehicle. A road vehicle embodying the invention in its drive system could have installed the means for a pedal drive, a petrol engine drive, and an electric traction motor drive. The transmission system of the invention could be used to selectively connect these various sources of power to the driving wheels of the vehicle. Such a vehicle could sometimes run on one power unit, sometimes on another power unit, and sometimes using two of the power units in combination. The various modes of drive could be conveniently interchangeable by the driver of the vehicle whether the vehicle was travelling or at rest. Again the power transmission system can provide means for connecting the drive wheels of the vehicle to energy storing systems, such as a fly wheel, or an electrical generator arranged to charge storage batteries carried on the vehicle for use in supplying the electric transmission motor.

While mention has been made of other road vehicles, it should be understood that the invention is also applicable to the propulsion of boats, trains and aircraft, and is applicable to the distribution of mechanical power in stationary drive mechanisms.

SUMMARY OF THE INVENTION

Accordingly the present invention provides a power transmission system comprising a housing, a transmission shaft mounted for rotation in that housing and extending outside the housing on either side thereof, a crown wheel gear mounted on the transmission shaft within the housing, a pinion gear in engagement with the crown wheel mounted on an output shaft carried for rotation in the housing, and a plurality of one-way clutches mounted in pairs on said transmission shaft, one of each pair being disposed on each side of the housing, each said clutch comprising a drive member by which a drive may be effected in one direction of rotation from a power source to said transmission shaft through the clutch.

BRIEF DESCRIPTION OF THE DRAWINGS

In order to promote a fuller understanding of the above, and other, aspects of the present invention, an embodiment will now be described, by way of example only, with reference to the accompanying drawings, in which.

Figure 1:
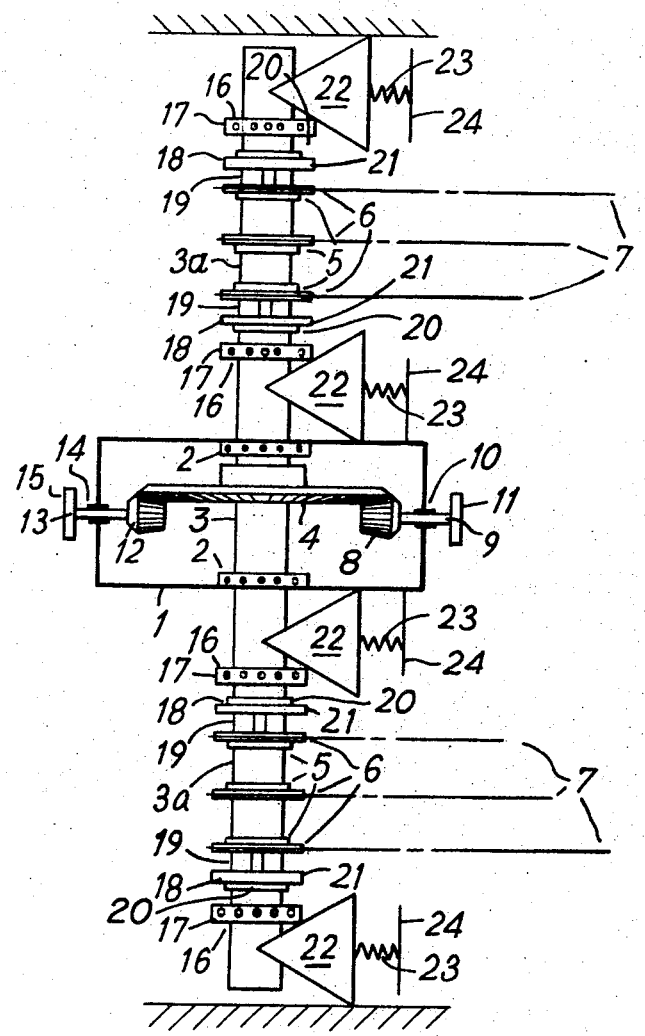
FIG. 1 shows a schematic plan view of a transmission system of the invention.

The power transmission system shown in FIG. 1 comprises a rectangular housing 1 having therein two oppositely positioned side bearings 2. The bearings 2 carry a transmission unit comprising a main transverse transmission shaft 3 which carries a crown wheel 4 locked to it and positioned in the housing 1. The ends 3a of the main transmission shaft 3 protrude from either side of the housing 1 in the manner of half-shafts and each carry a number of one-way clutches 5 incorporating drive members in the form of sprockets 6 on which engage drive chains 7 through which power may be transmitted to the shaft 3. The clutches 5 are arranged in pairs (three pairs being shown in this embodiment) and one of each pair is arranged on either side of the housing on the respective end 3a of the transmission shaft 3. The housing 1 also carries a pinion 8 in engagement with the crown wheel 4. The pinion 8 is carried on an output shaft 9 which is rotatably mounted in the housing by means of a bearing 10, and provided with a flange 11, or other suitable means, for connection to an item or items to be driven. The housing 1 also carries a second pinion 12 in engagement with the crown wheel 4 in a position diametrically opposite to that of the pinion 8. The pinion 12 is carried for rotation on a shaft 13 which is rotatably mounted in the housing by means of a bearing 14 and which is provided with a flange 15, or other suitable means, for connection to a further item or items to be driven.

In this embodiment two of the pairs of one-way clutches 5 are each provided with locking devices arranged to prevent their operation as one-way clutches, thus to achieve solid transmission of drive between the shaft 3 and the respective drive member or sprocket 6. More, or all, of the clutches may be provided with such locking devices.

Each clutch locking device comprises as shown in the drawings a bearing 16, the outer race of which is carried in a movable housing 17. A locking washer 18 is slidably mounted on the shaft 3 between the bearing 16 and the respective sprocket 6. The locking washers 18 are caused to rotate with the shaft 3 by means of splines or keys in known manner per se. Each locking washer comprises a disc formed with a collar arranged to receive the inner race bearing 16, and an outer rim in the form of a collar arranged to mate with a corresponding collar protruding from the adjacent face of the drive member or chain sprocket 6. Thus movement of the housing 17 towards the respective chain sprocket 6 causes engagement between the locking washer 18 and the sprocket to achieve a friction drive between the sprocket and the locking washer. The faces of the locking washer 18 and the corresponding faces of the sprocket 6 which so engage may preferably be roughened or milled to enhance such friction drive.

Control means are provided to selectively operate the clutch locking devices, such control means being shown, by way of example in this embodiment, in the form of wedges 22 which are each movably mounted in such position that on movement by control means (not shown) they can cause movement of the respective locking washer 18 to achieve engagement of the locking device. The wedges 22 are each resiliently biassed towards the disengaged position by means of a spring 23.

It will be appreciated that as an alternative to the chain sprockets 6 and chain drives, pulleys and belt drives may be used.

With the transmission system discussed above, when power is applied through one of the chain or belt drives to one pair of the one-way clutches to turn the main transverse transmission shaft, a selected pair of clutches which have been locked will also turn and drive the chain sprocket and connected chains, and thus whatever item is connected to them. Release of the control to the locked clutches will remove the pressure at the locking washers to release the locking action and drive.

The locking and releasing movement of the clutch locking devices could be accomplished mechanically by any one of several known arrangements of shaped levers, springs and cams, or by electromagnetic force. A specific means of control is not preferred.

One pair of clutch locking devices shown in the drawing could be used to facilitate "starting" a petrol engine either from the momentum of the vehicle or by means of an electric motor mechanically parallel-connected. Also, one pair of clutch locking devices shown could be used to facilitate the drive of an electric generator by a prime mover.

Depending on the application of the transmission system, the clutch locking devices are optional, as is their number.

No particular lay-out or positioning of driving or driven parts mechanically in parallel is considered essential. Any suitable power unit can be connected to any suitable pair of clutches, as preferred.

Figure 2:
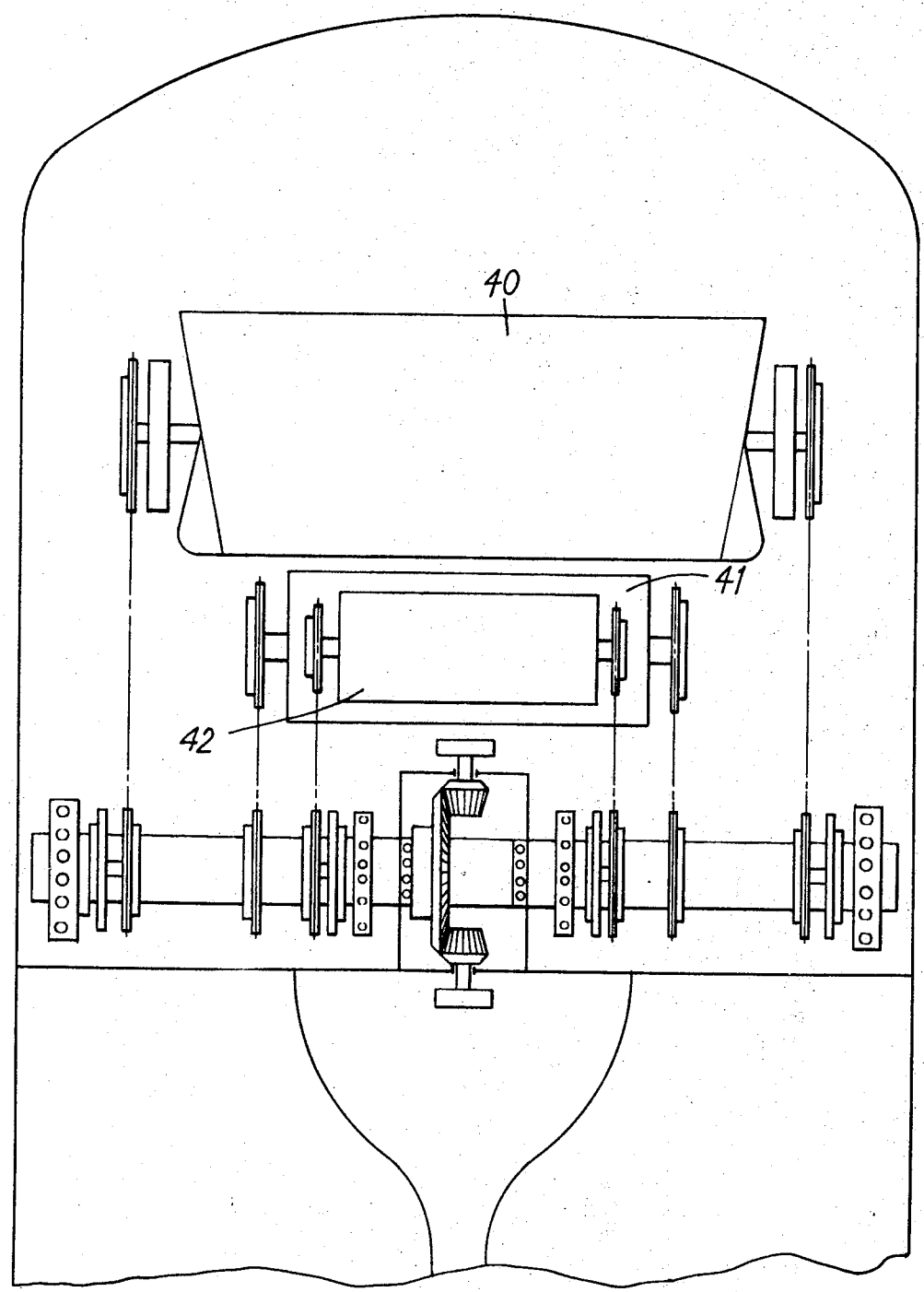
FIG. 2 shows the transmission system of FIG. 1 as arranged in a motor vehicle.

A typical arrangement in which the above transmission system may be put to use is shown in FIG. 2 where the transmission system is interposed between a petrol engine 40 and the normal clutch gear box and propellor shaft arrangement of a road vehicle. The petrol engine 40 is arranged to drive by means of suitable sprockets, the two outer chains 7 of the above arrangement, thus to drive the transmission shaft 3 through the respective one-way clutches and consequently to drive the crown wheel 4, the pinion 8 and thus the vehicle. An electrical traction motor 41 is connected to the intermediate chains 7 so that it may drive the transmission shaft 3. An alternator 42 is connected to the inner chains 7 so that it may be driven from the transmission shaft 3. A normal clutch driver operated clutch and gear box are interposed between the shaft 9 and the propellor shaft.

I claim:

1. A power transmission system comprising a housing, a transmission shaft mounted for rotation in that housing and extending outside the housing on either side thereof, a crown wheel gear mounted on the transmission shaft within the housing, a pinion gear in engagement with the crown wheel mounted on an output shaft carried for rotation in the housing, and a plurality of one-way clutches mounted in pairs on said transmission shaft, one of each pair being disposed on each side of the housing, each said clutch comprising a drive member by which a drive may be effected in one direction of rotation from a power source to said transmission shaft through the clutch.

2. A power transmission system as claimed in claim 1, wherein a second pinion gear is provided in engagement with said crown wheel and mounted on a second output shaft carried for rotation in the housing.

3. A power transmission system as claimed in claim 1, wherein selected ones of said pairs of clutches are provided with individual locking means arranged to cause solid drive through those clutches on operation of the locking means.

4. A power transmission system as claimed in claim 1, wherein said drive members are chain sprockets.

5. A power transmission system as claimed in claim 1, wherein said drive members are belt pulleys.

6. A road vehicle including the power transmission system of claim 1 and having at least two motive power units each connected to one pair of said clutch drive members, the output shaft being connected to the drive road wheels of the vehicle.

7. A road vehicle as claimed in claim 6, wherein the drive members of one of said pairs of clutches is connected to an electrical generator.

8. A road vehicle as claimed in claim 6, including a driver operated clutch and reduction gear box interposed between said output shaft and said road wheels.

* * * * *